(12) United States Patent
Yabe (10) Patent No.: US 6,446,779 B1
(45) Date of Patent: Sep. 10, 2002

(54) DAMPER ASSEMBLY

(75) Inventor: Hiroshi Yabe, Kakegawa (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/679,652

(22) Filed: Oct. 5, 2000

(30) Foreign Application Priority Data

Oct. 7, 1999 (JP) .......................................... 11-286197

(51) Int. Cl.[7] ................................................ F16F 15/12
(52) U.S. Cl. ...................... 192/213; 192/3.29; 192/3.3; 192/212
(58) Field of Search ............................... 192/3.28, 3.29, 192/212, 213, 138, 139, 3.3

(56) References Cited

U.S. PATENT DOCUMENTS

| | | | | |
|---|---|---|---|---|
| 4,716,998 A | * | 1/1988 | Tsukamoto et al. | 192/3.3 |
| 5,080,215 A | * | 1/1992 | Forster et al. | 192/106.2 |
| 5,246,399 A | * | 9/1993 | Yanko et al. | 192/106.2 X |
| 5,456,343 A | * | 10/1995 | Murata et al. | 192/3.29 |
| 5,655,635 A | * | 8/1997 | Yuergens et al. | 192/3.29 |
| 5,682,972 A | | 11/1997 | Sasada | 192/213 |
| 6,050,376 A | | 4/2000 | Yabe | 192/3.29 |

FOREIGN PATENT DOCUMENTS

JP  8-338475  12/1996

* cited by examiner

*Primary Examiner*—Saúl Rodriguez
(74) *Attorney, Agent, or Firm*—Miles & Stockbridge P.C.

(57) ABSTRACT

The present invention aims to provide a damper assembly in which, even if excessive load is received from an engine and if spring constants of springs arranged in series are changed, the springs are not damaged. The present invention further aims to make the damper assembly more compact. The damper assembly comprises a retainer plate and a driven plate and is designated so that springs are held in series through an intermediate member, and a relative angle between the retainer plate and the intermediate member is regulated by engaging a first projection provided on the intermediate member with a containing portion provided in the retainer plate and a relative angle between the retainer plate and the driven plate is regulated by engaging a second projection provided on the retainer plate with an abutment portion provided on the driven plate.

10 Claims, 9 Drawing Sheets

DAMPER ASSEMBLY

BACKGROUND OF THE INVENTION

1. Field of the Invention

The present invention relates to a damper assembly for a starting clutch in an automatic transmission and a damper assembly for a lock-up clutch.

2. Related Background Art

In the past, a damper assembly comprising a plurality of springs, in which an input member and an output member are elastically interconnected via springs in a rotational direction, has been used for absorbing abrupt fluctuation in torque to be inputted.

Figure 7:
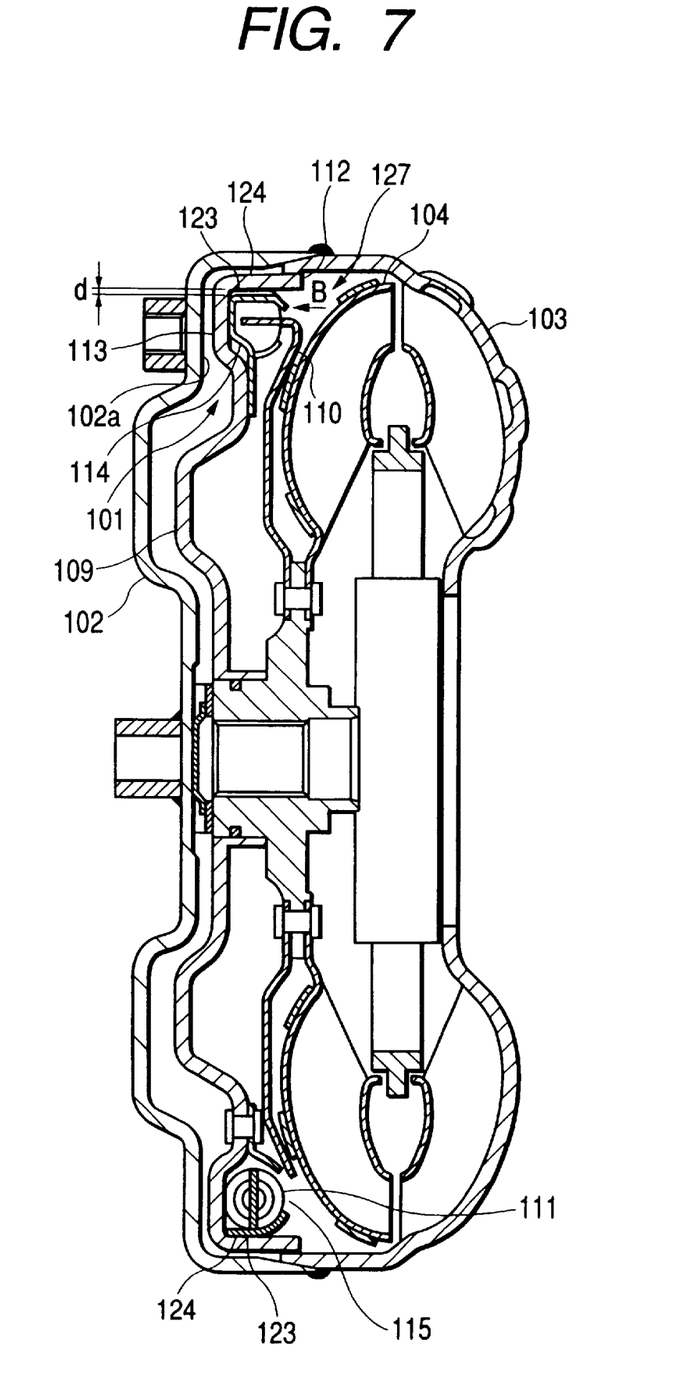
FIG. 7 is a sectional view showing a lock-up clutch into which a conventional damper assembly is incorporated, taken along the line VI—VI in FIG. 8.

As such a damper assembly, for example, a damper assembly as disclosed in Japanese Patent Application Laid-Open No. 8-338475 has been developed. FIG. 7 is a sectional view of a lock-up clutch 101 in which a damper assembly 127 is incorporated.

In the damper assembly, a plurality of spring holding portions 115, 121 are provided in an input member (piston plate 109, friction material 113, hold plate 114) and an output member (driven plate 110), respectively, in a circumferential direction, and a plurality of springs 111 are held in the spring holding portions in series, so that the input and output members are elastically interconnected in a rotational direction and the springs 111 held in series are interconnected via an intermediate member 123 rotatable relative to the input and output members.

Figure 8:
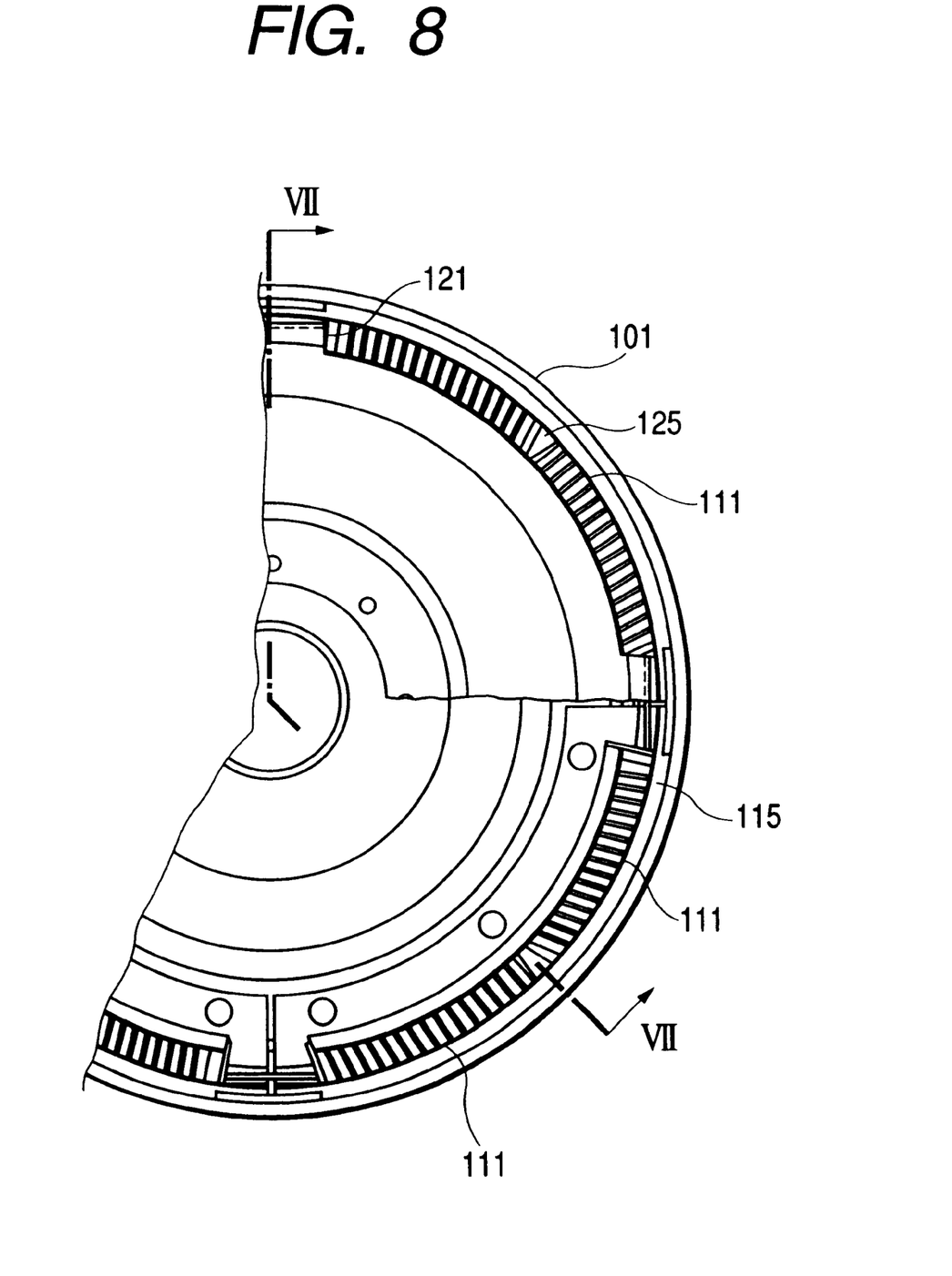
FIG. 8 is a back side view, in partial section, looked at from a direction shown by the arrow B in FIG. 7.
Figure 9:
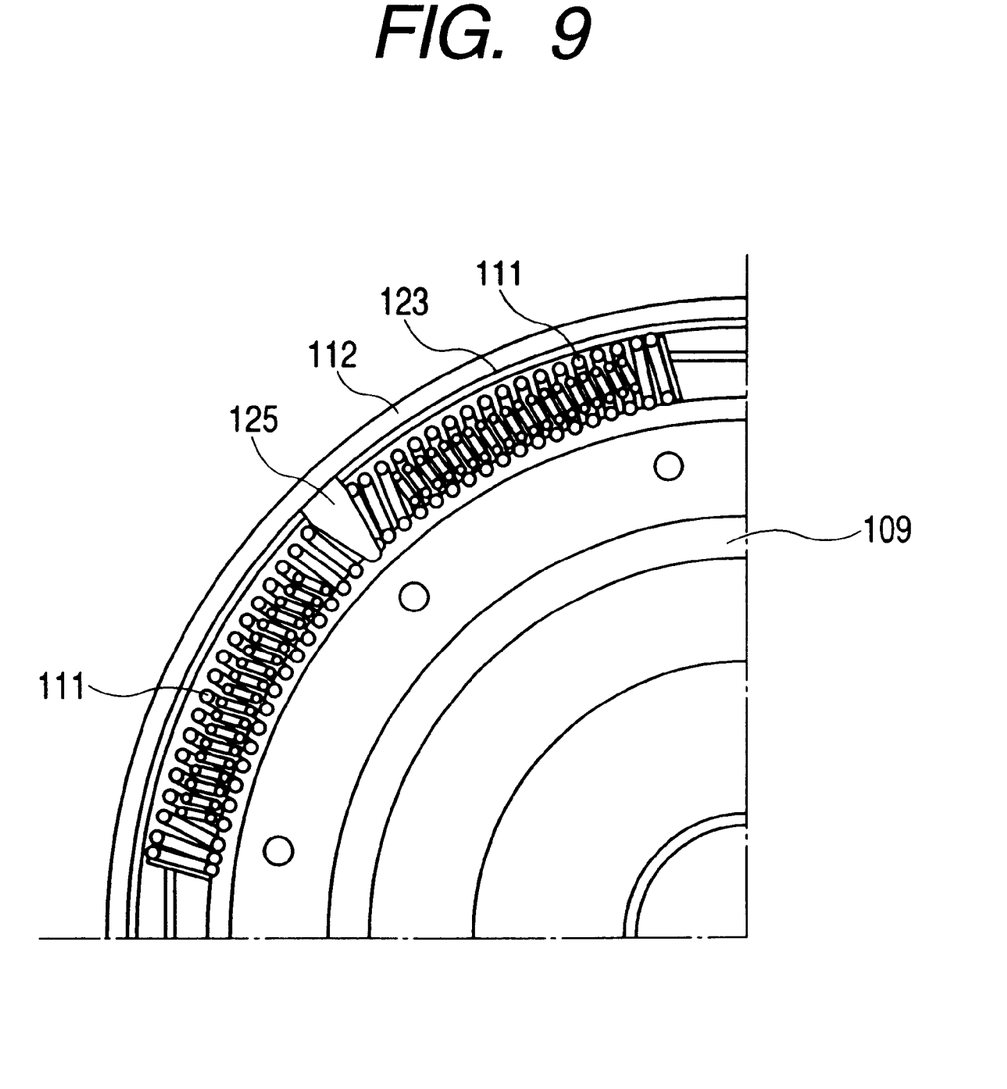
FIG. 9 is a back side view looked at from the direction shown by the arrow B in FIG. 7, with a driven plate and a hold plate removed.

Further, the intermediate member 123 is constituted by a cylindrical connecting portion 124 rotatably housed in a gap d (refer to FIG. 8) between an outer periphery of the hold plate 114 and an inner periphery of a cylindrical portion 112 of the piston plate 109, and a plurality (four) of pawls 125 bent radially inwardly in a substantially L-shape at one side of the connecting portion 124.

Each of the pawls 125 of the intermediate member 123 has a tapered tip end and is inserted between the springs 111 held in the spring holding portions 115, 121 so that, when the input and output members are rotated relative to each other, the springs 111 are operated in series without deforming the springs in a curved form as less as possible. On the other hand, the connecting portion 124 of the intermediate member 123 serves to interconnect all of the pawls 125 in an annular fashion so that, when the input and output members are rotated relative to each other, all of the pawls 125 are synchronized to operate the springs 111 held in the spring holding portions 115, 121 in series, similarly.

With an arrangement as mentioned above, when the piston plate 109 is advanced by control oil pressure acting on a back side of the piston plate 109, the friction material 113 on a front side of the piston plate 109 is engaged by an inner surface 102a of a converter cover 102, with the result that the converter cover 102 and a turbine 104, i.e., a pump 103 and the turbine 104 are directly interconnected mechanically through the lock-up clutch 101, thereby establishing a lock-up condition. In this condition, the torque inputted to the piston plate 109 of the lock-up clutch 101 is transmitted, through the plurality of springs 111, to the driven plate 110 and then to the turbine 104. In this case, the pair of springs 111 housed in the corresponding spring holding portions 115, 121 of the hold plate 114 and the driven plate 110 act in series via the intermediate member 123 to absorb the transmitted torque with the total length of both springs 111.

However, in the above-mentioned conventional damper assembly, during the operation, if excessive load is received from the engine, the springs of the damper assembly may be closely contacted (i.e., over compressed) to damage the springs. Further, if spring constants of two springs arranged in series are different, the springs having smaller spring constant may be closely contacted firstly to damage them.

Furthermore, in the conventional damper assembly, since the connecting member is disposed in the cylindrical gap between the outer periphery of the hold plate 114 and the cylindrical portion of the piston plate 109, outer diameters of the springs to be inserted are limited or the entire dimension of the damper assembly becomes bulky.

SUMMARY OF THE INVENTION

Therefore, an object of the present invention is to provide a damper assembly in which springs of the damper assembly are prevented from being closely contacted to prevent damage of the springs even if excessively load is received from an engine during the operation of the damper assembly.

Another object of the present invention is to provide a damper assembly in which, even when spring constants of two springs arranged in series are changed, the springs having smaller spring constant are prevented from being closely contacted to prevent damage of such springs.

A further object of the present invention is to make the entire damper assembly compact.

To achieve the above objects, according to the present invention, there is provided a damper assembly comprising a retainer plate and a driven plate, and wherein springs are held in series through an intermediate member, and a relative angle between the retainer plate and the intermediate member is regulated by engaging a first projection provided on the intermediate member with a containing portion provided in the retainer plate, and a relative angle between the retainer plate and the driven plate is regulated by engaging a second projection provided on the retainer plate with an abutment portion provided on the driven plate.

With this arrangement, the first projection provided on the intermediate member is regulated by the containing portion of the retainer plate, and, further, the abutment portion provided on the driven plate is received by the second projection of the retainer plate, so that the relative angles of the intermediate member and the driven plate with respect to the retainer plate can be regulated.

Since the connecting portion of the intermediate member is disposed inwardly of the springs, an outer diameter of the damper assembly is not changed. Thus, the damper assembly can be made more compact.

BRIEF DESCRIPTION OF THE DRAWINGS

FIGS. 3A, 3B, 3C and 3D are views showing a first retainer plate, where

FIGS. 4A, 4B, 4C, 4D and 4E are views showing a second retainer plate, where

DETAILED DESCRIPTION OF THE PREFERRED EMBODIMENTS

The present invention provides a damper assembly comprising a retainer plate and a driven plate, and wherein springs are held in series through an intermediate member, and a relative angle between the retainer plate and the intermediate member is regulated by engaging a first projection provided on the intermediate member with a containing portion provided in the retainer plate, and a relative angle between the retainer plate and the driven plate is regulated by engaging a second projection provided on the retainer plate with an abutment portion provided on the driven plate.

Further, the first projection of the intermediate member as a constructural part of the damper assembly may be provided at an inner diameter side or an outer diameter side.

In addition, the springs held in series by the retainer member via the intermediate member may have different spring constants.

The damper assembly can be used with a starting clutch an a lock-up clutch.

Figure 1:
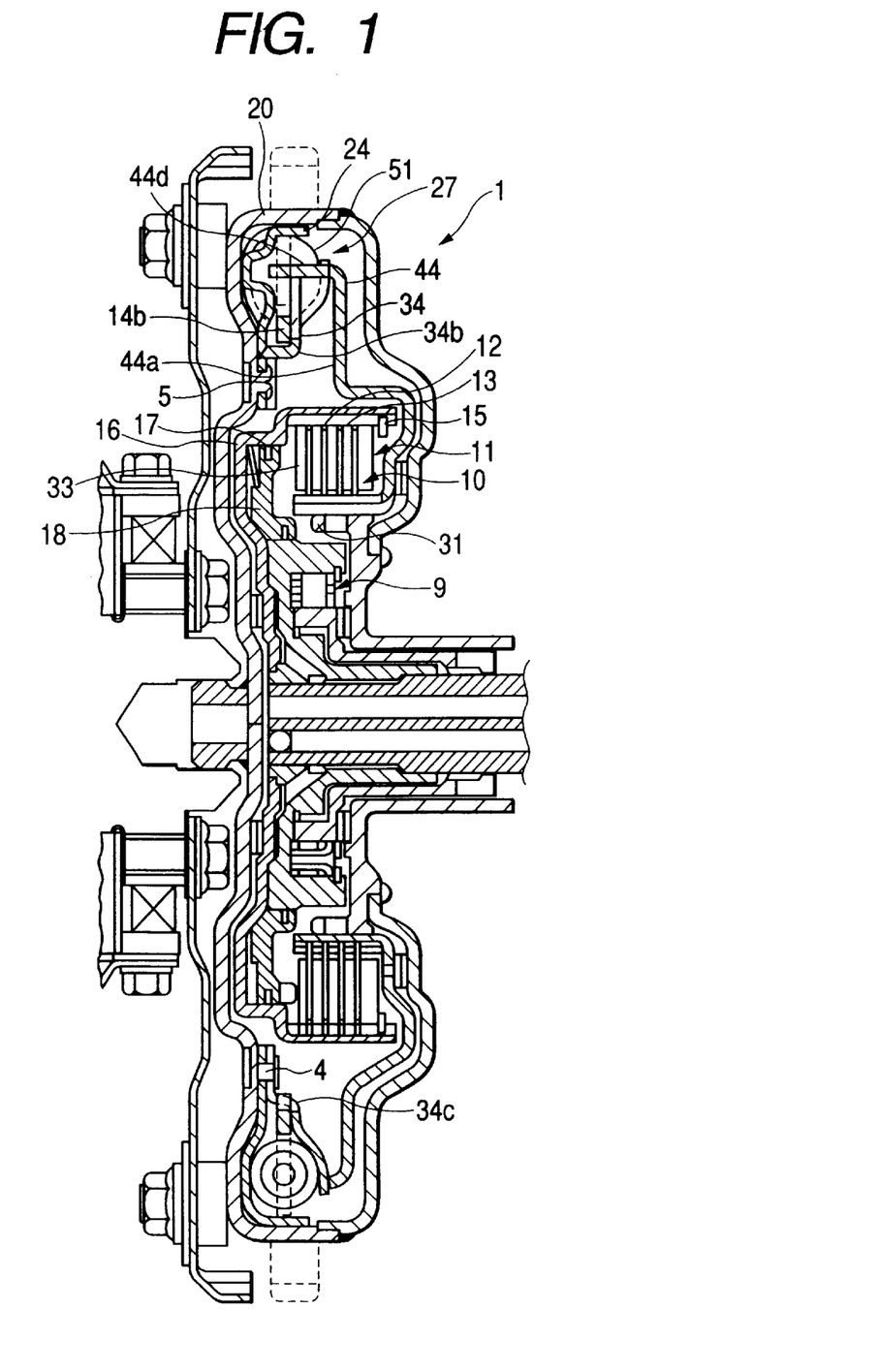
FIG. 1 is a sectional view of a starting clutch into which a damper assembly according to the present invention is incorporated, taken along the line I—I in FIG. 2.

Now, the present invention will be fully described in connection with embodiments thereof with reference to the accompanying drawings. Incidentally, in the drawings, the same elements are designated by the same reference numerals. FIG. 1 is an axial sectional view showing a damper assembly according to the present invention which is applied to a starting clutch, taken along the line I—I in FIG. 2.

First of all, the entire construction of the starting clutch will be explained. The starting clutch 1 has a wet type multi-plate clutch 11, and, within a clutch case 16 of the wet type multi-plate clutch 11, substantially annular friction plates 12 as output friction engaging elements are spline-fitted on an outer periphery of a hub 31, and these friction plates 12 are alternately arranged with substantially annular separator plates 13 as input friction engaging elements disposed on an inner periphery of the clutch case 16. A packing plate 10 is supported by a substantially annular stop ring 15 at an axial outer side (right in FIG. 1).

Although the multi-plate clutch 11 is constituted by four friction plates 12 and four separator plates 13, of course, it should be noted that the number of these friction engaging elements can optionally be changed in accordance with set torque. Further, substantially annular friction materials 33 are secured to both axial surfaces of each friction plate 12 by adhesive or the like. Of course, in accordance with the required torque, the friction material may be secured to only one surface of each friction plate 12.

On the other hand, at the left of the friction engaging elements, a piston 18 is arranged within the clutch case 16 with the interposition of an O-ring 17 disposed between the piston and the inner surface of the clutch case so that, when the piston 18 is urged toward the right in FIG. 1, the friction engaging elements are engaged with each other.

Further, a one-way clutch 9 as a back stopper is disposed at an inside of the piston 18.

The starting clutch 1 includes the wet type multi-plate clutch 11, a housing 20 surrounding the outer periphery of the wet type multi-plate clutch 11, and a damper assembly 27 according to the present invention disposed between the clutch case 16 and the housing 20.

Figure 2:
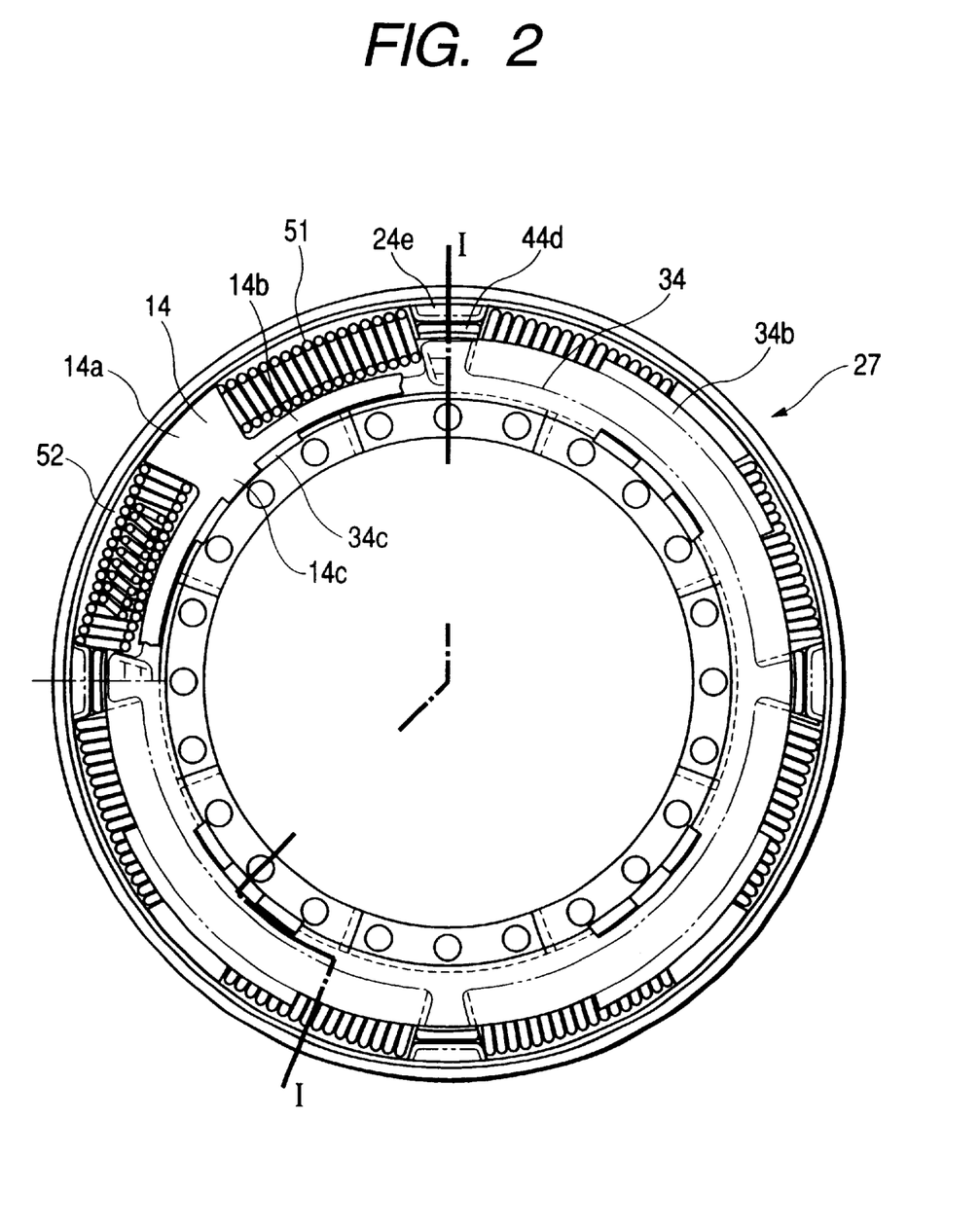
FIG. 2 is a front view, in partial section, of the damper assembly according to the present invention.

FIG. 2 is a front view, in partial section, of the damper assembly according to the present invention. The damper assembly 27 includes first and second retainer plates 24, 34 for holding springs on an inner wall of the housing 20, and a plurality of springs disposed in series in spring holding portions defined by the first and second retainer plates. Incidentally, eight springs are substantially equidistantly disposed along a circumferential direction, and springs having smaller outer diameter are disposed within four outer springs to form double wrap coil springs, and single wrap coil springs and double wrap coil springs are alternately arranged. Incidentally, in the illustrated embodiment, while the double wrap coil springs were used, single wrap coil springs having the same spring force may be used. It should be noted that the number of the springs may optionally be changed to obtain desired damper performance.

The damper assembly 27 further includes an annular intermediate member 14 and an annular driven plate 44. The driven plate 44 has a plurality of pawls or abutment portions 44d (FIG. 1) having substantially L-shaped cross-section and disposed on an outer periphery of a substantially annular base 44a at positions corresponding to curved portions 24e of the first retainer plate 24.

The springs 51, 52 held in the spring holding portions are interconnected in series via the intermediate member 14 rotatable relative to the driven plate 44 within the spring holding portions.

The intermediate plate 14 has an annular connecting portion 14b, and a projection 14a and first projection 14c protruded radially outwardly and inwardly from the connecting portion 14b. The first projection 14c can abut against the second retainer plate. The projection 14a protruded radially outwardly from the connecting portion 14b is inserted between the springs 51, 52 so that, when the first and second retainer plates are rotated relative to the driven plate, the springs 51, 52 are operated in series. Further, the connecting portion 14b is disposed radially inwardly (of the first and second retainer plates) with respect to the springs.

Figure 3A:
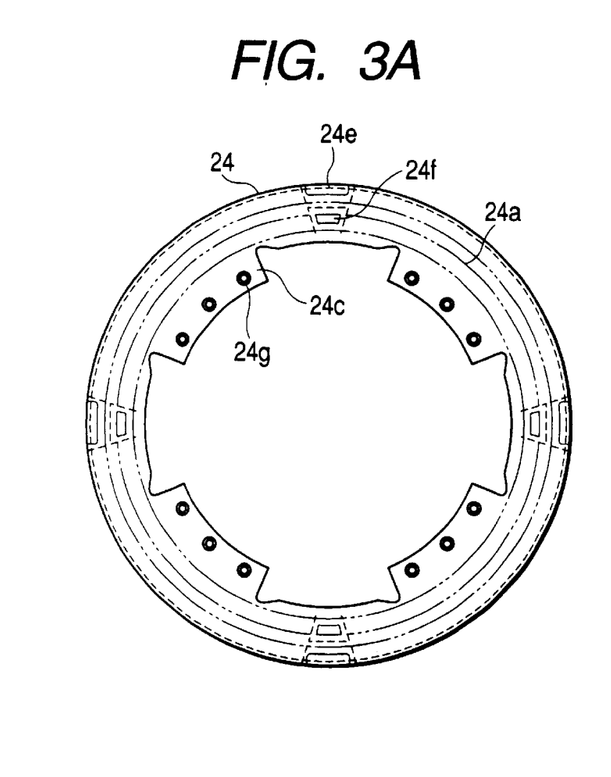
FIG. 3A is a back side view.
Figure 3B:
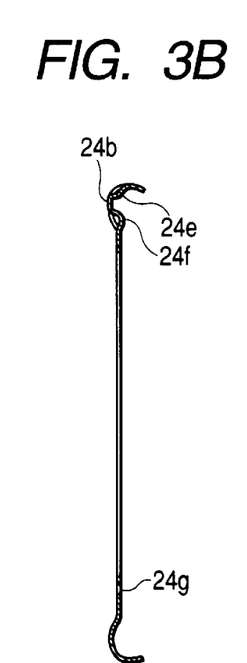
FIG. 3B is a sectional view taken along the line IIIB—IIIB in FIG. 3C.
Figure 3C:
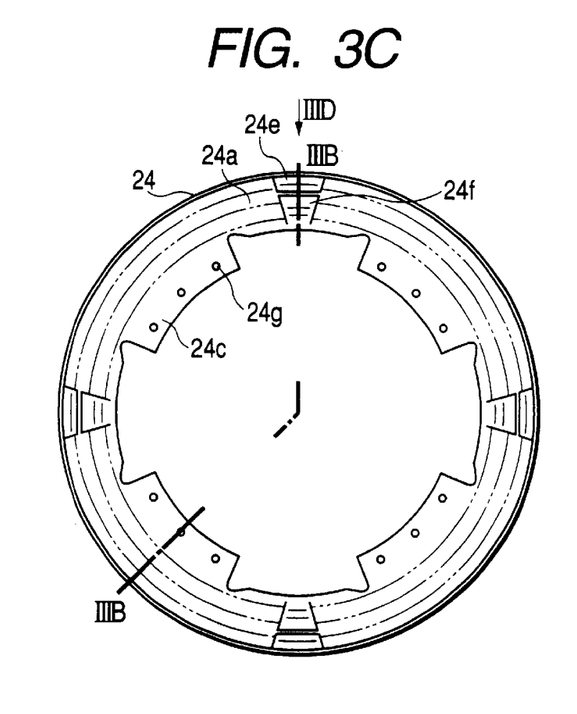
FIG. 3C is a front view and FIG. 3D is a side view looked at from a direction shown by the arrow IIID.
Figure 3D:
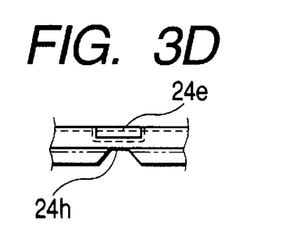

Next, the first retainer plate 24 will be explained with reference to FIGS. 3A to 3D. Here, FIGS. 3A, 3B, 3C and 3D are views showing the first retainer plate 24, where FIG. 3A is a back side view, FIG. 3B is a sectional view taken along the line IIIB—IIIB in FIG. 3C, FIG. 3C is a front view and FIG. 3D is a side view looked at from a direction shown by the arrow IIID.

The first retainer plate 24 is a substantially annular member having a predetermined thickness and has a substantially annular base 24a. A circumferential edge portion 24b extending radially outwardly and having an axial semi-circular cross-section is provided on a radially outer periphery of the base 24a, and a plurality of flange portions 24c protruding radially inwardly are provided on a radially inner periphery of the base.

The plurality of flange portions 24c are equidistantly disposed along a circumferential direction. Each flange portion 24c is provided with a plurality of axial through holes 24g through which rivets 4 (FIG. 1) for securing the first retainer plate 24 to the second retainer plate 34 is passed and which are equidistantly disposed along the circumferential direction. Incidentally, in the illustrated embodiment, while an example that each flange portion 24c is provided with three holes 24g was explained, it should be noted that the present invention is not limited to such an embodiment.

Further, the circumferential edge portion 24b is provided with a plurality of curved portions 24e, 24f which are spaced apart from each other in a radial direction of the first retainer and are curved in an axial direction, and axial one ends of the springs mounted abut against circumferential one ends of the curved portions.

FIG. 3D is a partial side view of the first retainer plate, looked at from the direction shown by the arrow IIID in FIG. 3C. A plurality of recesses 24h equidistantly along the circumferential direction are formed in the edge of the circumferential edge portion 24b.

Figure 4A:
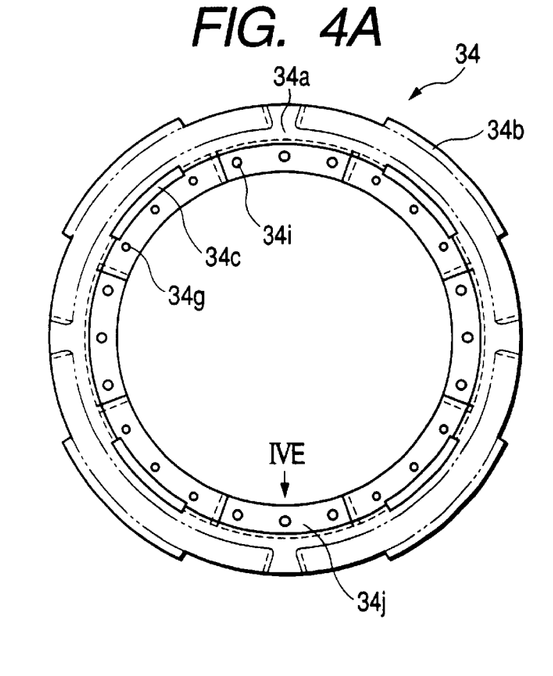
FIG. 4A is a front view.
Figure 4B:
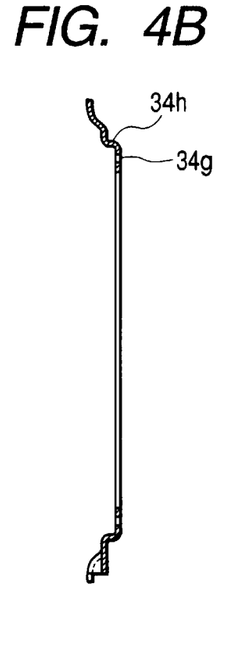
FIG. 4B is a sectional view taken along the line IVB—IVB in FIG. 4C.
Figure 4C:
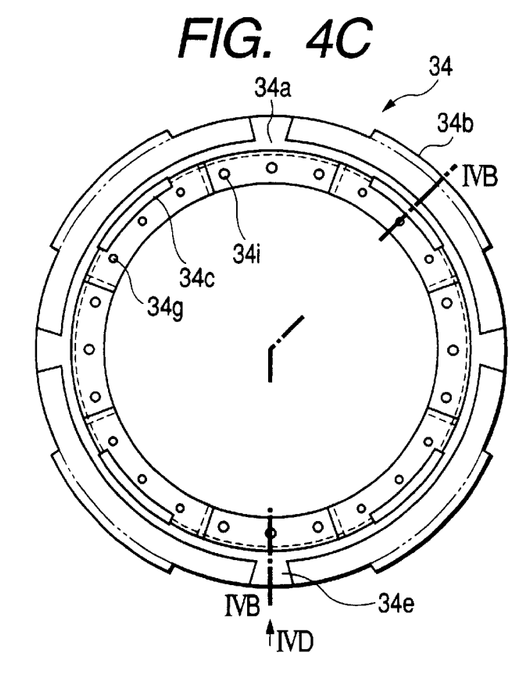
FIG. 4C is a back side view.
Figure 4D:
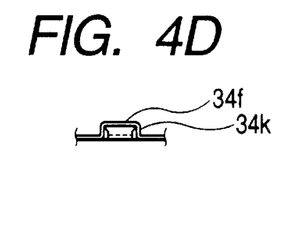
FIG. 4D is a side view looked at from a direction shown by the arrow IVD and FIG. 4E is a side view looked at from a direction shown by the arrow IVE.

Now, the second retainer plate 34 will be explained with reference to FIGS. 4A to 4E. Here, FIGS. 4A, 4B, 4C, 4D and 4E are views showing the second retainer plate 34, where FIG. 4A is front view, FIG. 4B is a sectional view taken along the line IVB—IVB in FIG. 4C, FIG. 4C is a back side view, FIG. 4D is a view looked at from a direction shown by the arrow IVD and FIG. 4E is a side view looked at from a direction shown by the arrow IVE.

Similar to the first retainer plate 24, the second retainer plate 34 is a substantially annular member having a predetermined thickness and has a substantially annular base 34a. Four protruded portions or second projections 34b protruding radially outwardly and disposed equidistantly along a circumferential direction are provided on a radially outer periphery of the base 34a, and a plurality of containing portions 34c as axial through holes are provided in a radially inner peripheral area of the base. First projections 14c (described later) of the intermediate member 14 are slid within the containing portions 34c, so that circumferential movements of the first projections are regulated by the containing portions 34c.

Further, inwardly of the containing portions 34c, along the circumferential direction, there are provided a plurality of large axial through holes 34i used for securing the second retainer plate to the housing 20, and a plurality of small axial through holes 34g used for securing the first retainer plate 24 to the second retainer plate 34. In a condition the first and second retainer plates are assembled, the small holes 34g are aligned with the holes 24g, thereby permitting the passage of the rivets 4. On the other hand, the plurality of holes 34i are formed in recessed portions 34j (described later), and the second retainer plate is secured to the housing by inserting protruded portions 5 (FIG. 1) of the housing 20 into the holes 34i and by caulking these protruded portions against the holes. Incidentally, in the illustrated embodiment, while an example that three large holes 34i are equidistantly arranged along the circumferential direction as one block and three small holes 34g are also equidistantly arranged along the circumferential direction as one block and blocks including the large holes and the blocks including the small holes are alternately arranged in the circumferential direction was explained, the arrangement and the number of holes are not limited to the illustrated embodiment.

Figure 4E:
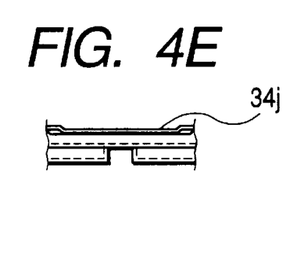

Further, FIG. 4E is a view showing a stepped portion 34e, looked at from inside of the second retainer (direction shown by the arrow IVE). As shown, the second retainer plate 34 is provided at its inner periphery with a plurality of recessed portions 34j equidistantly disposed along the circumferential direction. The above-mentioned holes 34i are provided in the recessed portions 34j. Incidentally, in FIG. 4B, the recessed portions 34j are omitted from illustration.

Further, in the base 34a, each stepped portion 34e having a convex shape in an axial direction and a laid-U shape looked at from the direction IVD is located at a substantially middle between two second projections 34b adjacent in the circumferential direction. FIG. 4D shows the stepped portion 34e looked at from the direction IVD in FIG. 4C. The stepped portion 34e has two substantially parallel side walls 34k protruded radially, and a top plate 34f extending between the side walls 34k. The top plate 34f is flush with the base 34a.

Figure 5A:
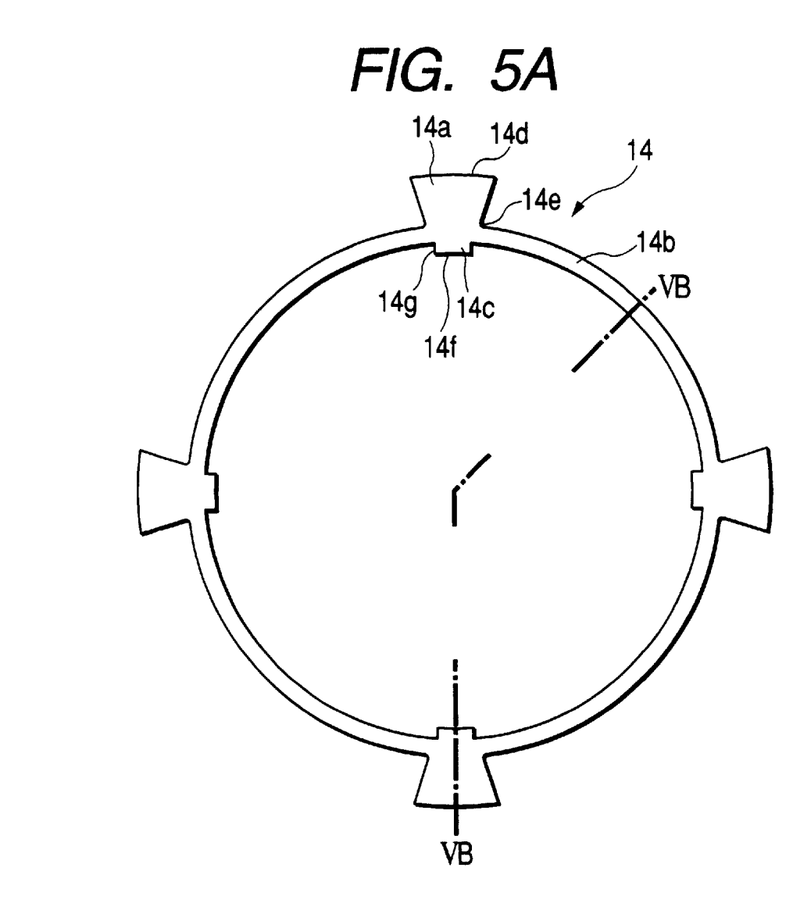
FIG. 5A is a front view of an intermediate member.
Figure 5B:
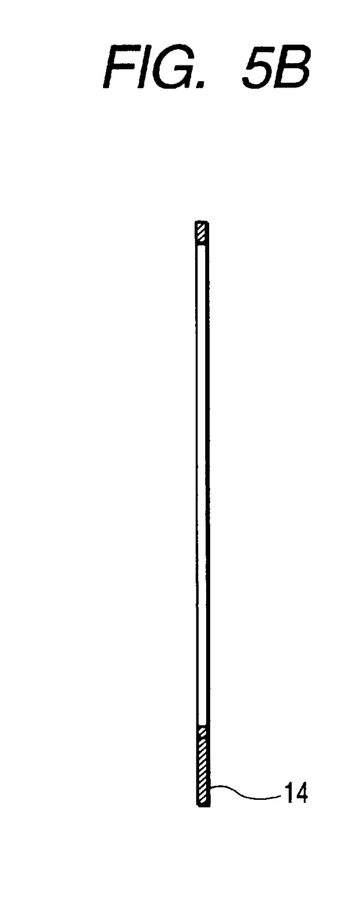
FIG. 5B is a sectional view taken along the line VB—VB in FIG. 5A.

Next, the intermediate member 14 will be explained. FIG. 5A is a front view of the intermediate member 14, and FIG. 5B is a sectional view taken along the line VB—VB in FIG. 5A. The intermediate member 14 has projections 14a to be inserted between two springs held in the spring holding portions, an annular connecting portion 14b interconnecting these projections, first projections 14c opposed to the projections 14a in a radial direction. In the illustrated embodiment, four projections 14a and four first projections 14c are equidistantly arranged along a circumferential direction, respectively. Each projection 14a has an arc end portion 14d and a base 14e, and a circumferential length of the base is smaller than that of the end portion 14d, and a height of the projection is substantially equal to or slightly smaller than the diameter of the spring.

Incidentally, the first projection 14c has a predetermined height and includes an arc end portion 14f and a base 14g, and a circumferential length of the end portion 14f is substantially equal to that of the base 14g. Incidentally, it should be noted that the height and the circumferential length can be determined appropriately in accordance with set torque of the damper assemble.

With the above-mentioned arrangement, a torque transmitting path is established as follows. For example, the torque transmitted from an output shaft of the engine is transmitted to the driven plate 44 through the first and second retainer plates 24, 34 (input), springs 51, intermediate member 14 and springs 52.

If the torque greater than the set load of the springs 51 is inputted, the first projections 14c act, with the result that the torque is transmitted to the driven plate 44 through the first and second retainer plates 24, 34 (input), intermediate member 14 and springs 52. in the operation of the damper assembly, before the springs 51 are closely contacted with each other by the input torque, the first projections 14c of the intermediate member 14 abut against the circumferential ends of the containing portions 34c.

Further, if the excessive torque is inputted, the abutment portions 44d act, with the result that the torque is transmitted to the driven plate 44 through the first and second retainer plates 24, 34 (input). In this case, in the operation of the damper assembly, before the springs 51 are closely contacted with each other by the input torque, the first projections of the intermediate member 14 abut against the circumferential ends of the containing portions 34c and, before the springs 52 are closely contacted with each other, the abutment portions 44d of the driven plate abut against the second projections 34b. In this way, the springs 51, 52 are not subjected to load greater than the set load.

Figure 6:
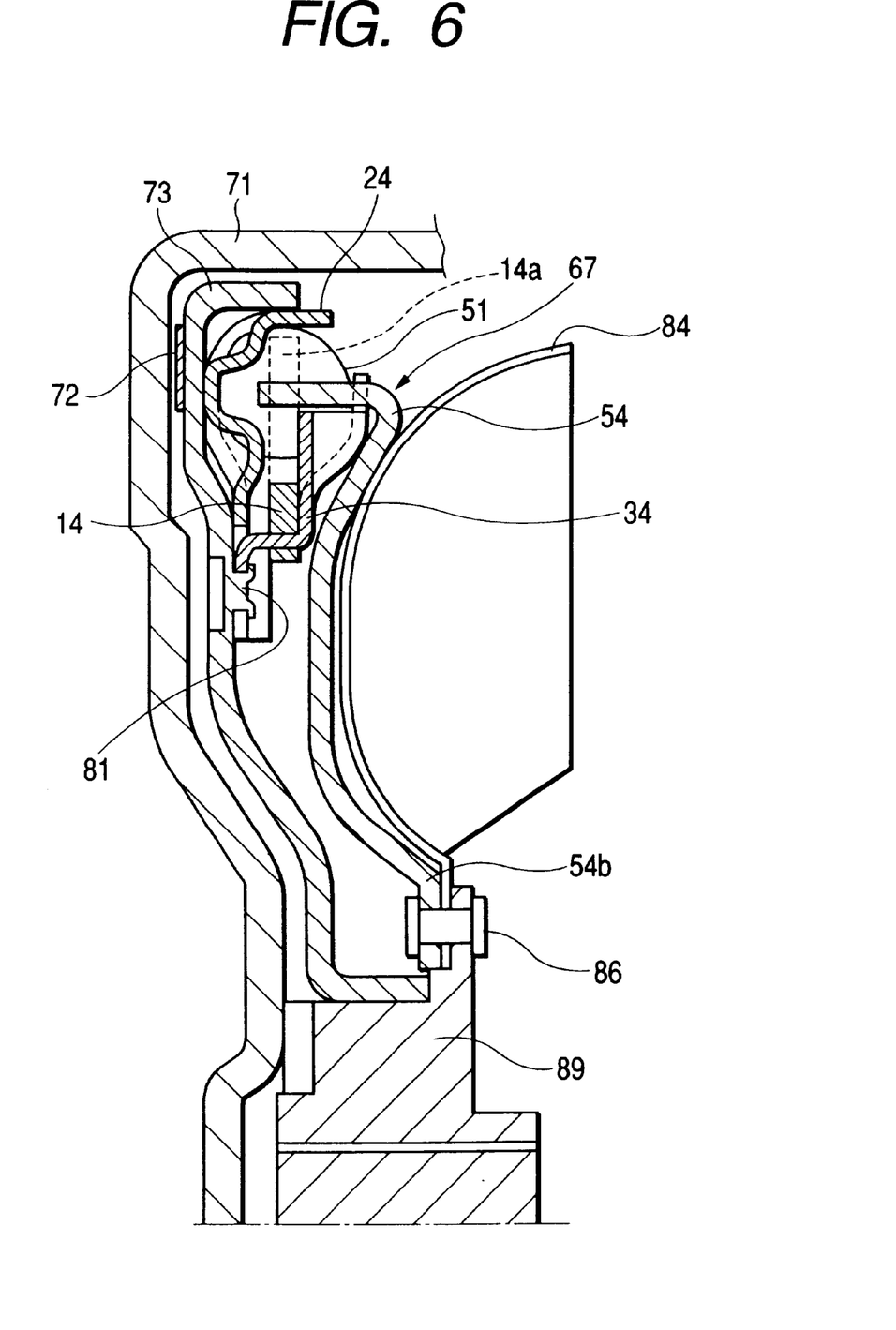
FIG. 6 is an axial partial sectional view showing a damper assembly according to another embodiment of the present invention.

Next, another embodiment in which the damper assembly according to the present invention is applied to a torque converter having a lock-up function will be explained. FIG.

6 is an axial partial sectional view showing a part of a damper assembly 67 according to another embodiment. The damper assembly 67 includes an input piston or lock-up piston 73, and first and second retainer plates 24, 34 for holding springs 51. Incidentally, the construction the damper assembly according to the illustrated embodiment is substantially similar to that of the damper assembly 27 according to the first embodiment. Namely, the first and second retainer plates 24, 34 are arranged on an inner wall of the lock-up piston 73, and a plurality of springs are disposed in series in spring holding portions defined by the first and second retainer plates 24, 34.

Further, each of projections 14a constituting an intermediate member 14 are inserted between two springs to connect the springs in series. Further, an annular connecting portion 14b of the intermediate member 14 extends in the axial direction of the springs and is located inside (of the first and second retainer plates in the radial direction).

The lock-up piston 73 is provided with a projection 81 which is fitted into and caulked against a hole of the second retainer plate 34. The first retainer plate 24 is secured to the second retainer plate 34 in the same manner as the first embodiment.

An axial one end of each spring 51 abuts against the circumferential edge portion of the first retainer plate and the abutment portion of the driven plate, and the other end abuts against the projection of the intermediate member. Incidentally, similar to the first embodiment, the springs include single wrap coil springs and double wrap coil springs.

Further, friction materials 72 are adhered to an outer surface of the lock-up piston 73 so that, when the lock-up piston 73 is shifted axially to be engaged by an inner surface of a front cover 71, the lock-up piston 73 is closely contacted with the front cover 71 via the friction materials 72, thereby establishing the joining conditions. And, the torque is transmitted in the condition that these elements are joined to each other.

Incidentally, a turbine linear 84 as an output member of a torque converter portion is secured to a turbine hub 89 by rivets 86. The driven plate 54 is secured to the turbine liner 84 at a fixed end 54b by a rivet 86 and the like.

With the arrangement as mentioned above, a torque transmitting path is established as follows. The torque is transmitted is transmitted to the driven plate 54 through the torque converter (input), front cover 71, friction materials 72, lick-up piston 73, first and second retainer plates 24, 34, springs 51, intermediate member 14 and springs 52.

When the first projections act, the torque is transmitted is transmitted to the driven plate 54 through the first and second retainer plates 24, 34 (input), intermediate member 14 and springs 52.

If the excessive torque is inputted, the abutment portions 44d act, with the result that the torque is transmitted to the driven plate 54 through the first and second retainer plates 24, 34 (input).

In this way, similar to the first embodiment, the springs are not subjected to any load greater than the set load.

Incidentally, it should be noted that the above-mentioned embodiments are merely examples but do not limit the present invention.

Even if the excessive load is received from the engine during the operation of the damper assembly, the springs of the damper assembly can be prevented from being closely contacted, thereby preventing the damage of the springs.

Further, in the damper assembly, even when the spring constants of two rows of springs connected in series are changed, the springs of the damper assembly can be prevented from being closely contacted, thereby preventing the damage of the springs, regardless of magnitude of the spring constants. Thus, since there is no influence of the close contacts between the springs and dispersion in spring property, the operation of the damper assembly can be stabilized.

Since the connecting portion of the intermediate member is located inwardly of the springs, the damper assembly can be made more compact.

What is claimed is:

1. A damper assembly comprising:
    a retainer plate; and
    a driven plate;
    wherein springs are held in series through an intermediate member to define a torque transmission path between said retainer plate and said driven plate through said springs and said intermediate member; and
    further wherein a relative angle between said retainer plate and said intermediate member is regulated by engaging a first projection provided on said intermediate member with a containing portion provided in said retainer plate, and a relative angle between said retainer plate and said driven plate is regulated by engaging a second projection provided on said retainer plate with an abutment portion provided on said driven plate.

2. A damper assembly according to claim 1, wherein the damper assembly is used with a starting clutch.

3. A damper assembly according to claim 1, wherein the damper assembly is used with a lock-up clutch.

4. A starting clutch comprising the damper assembly according to claim 1.

5. A lockup clutch apparatus comprising the damper assembly according to claim 1.

6. A damper assembly according to claim 1, wherein said springs include springs of different spring constants which are arranged in an alternating relationship at substantially a same circumference.

7. A damper assembly according to claim 2, wherein said springs include springs of different spring constants which are arranged in an alternating relationship at substantially a same circumference.

8. A damper assembly according to claim 3, wherein said springs include springs of different spring constants which are arranged in an alternating relationship at substantially a same circumference.

9. A starting clutch according to claim 4, wherein said springs include springs of different spring constants which are arranged in an alternating relationship at substantially a same circumference.

10. A lock-up clutch apparatus according to claim 5, wherein said springs include springs of different spring constants which are arranged in an alternating relationship at substantially a same circumference.

* * * * *